Patented July 31, 1934

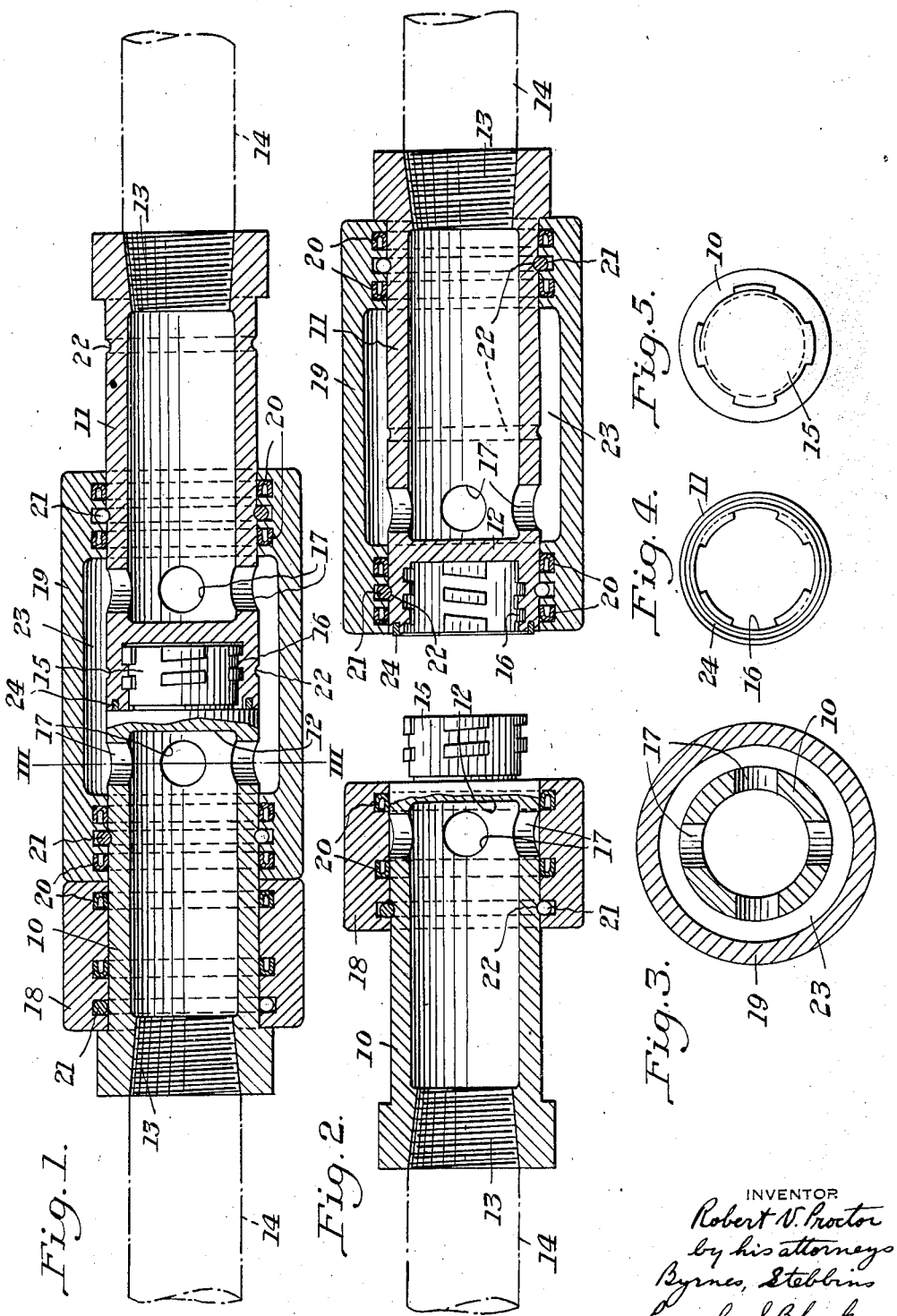

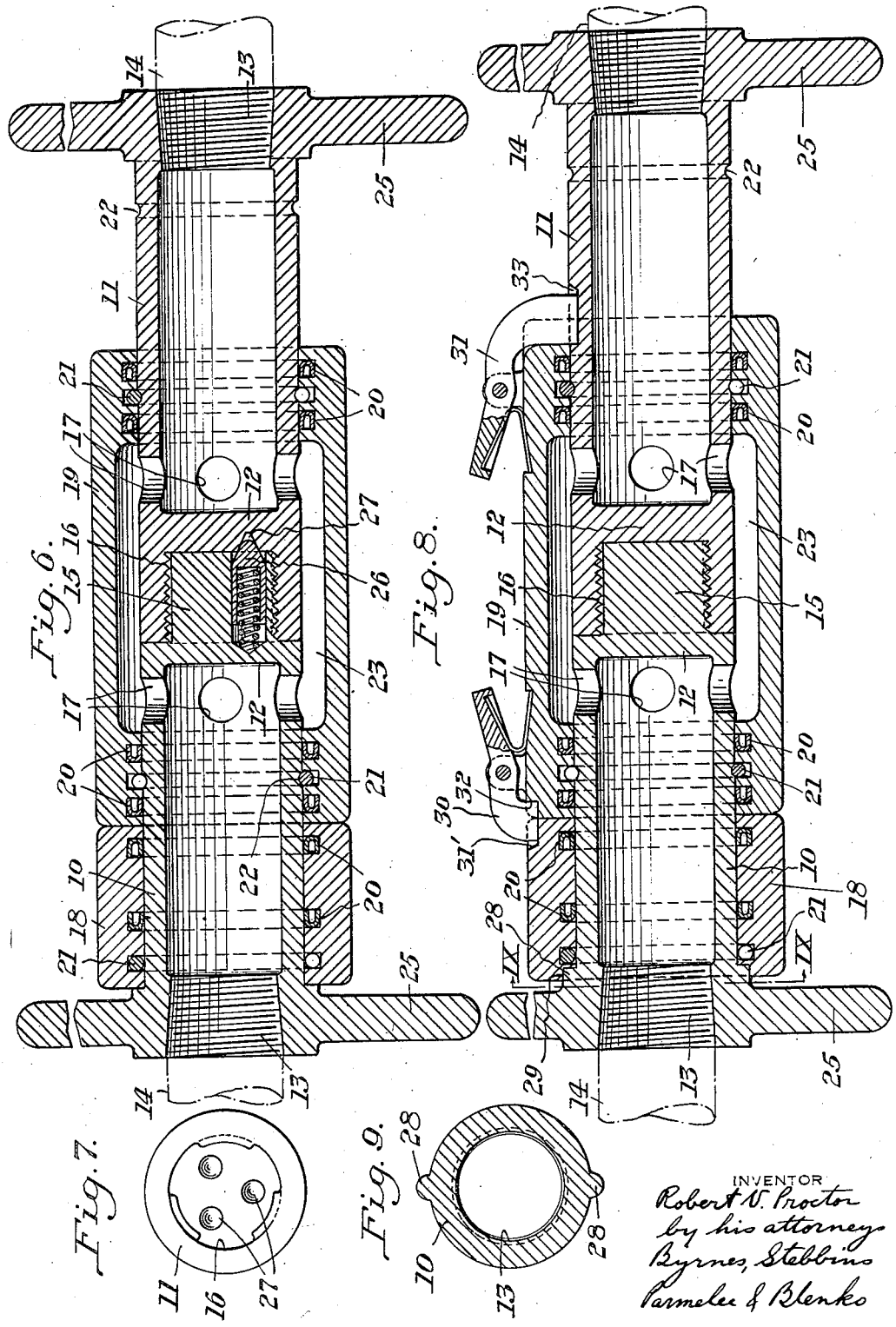

1,968,421

UNITED STATES PATENT OFFICE 1,968,421

VALVED COUPLING

Robert V. Proctor, Youngstown, Ohio, assignor to The Commercial Shearing & Stamping Company, Youngstown, Ohio, a corporation of Ohio Application January 29, 1931, Serial No. 512,051

7 Claims. (Cl. 137—69)

My invention relates to couplings, and, in particular, to couplings for conduits adapted to carry fluid under pressure of a type such that the escape of fluid from the conduits is prevented when the coupling is made or broken.

In many installations of conduits for carrying fluid under pressure, it is desirable to be able to couple or uncouple sections of the conduit without loss of the fluid. A particular example, which is only one of many, is found in the hydraulic systems employed on motor trucks and trailers for operating dump bodies thereon. It is obvious that a coupling for the oil systems of the truck and trailer which could be quickly made or broken without the loss of fluid, would be a very useful device to permit use of the truck with or without the trailer.

The only coupling of this type of which I am aware is objectionable because its construction is complicated and expensive and it requires considerable labor to make or break the coupling. I have invented a coupling which overcomes these disadvantages, and, in addition, possesses other novel features and advantages which will become apparent as the description of the invention proceeds.

According to the invention, I provide a pair of tubular chambers or terminals, each having a closed end, for the conduits to be connected. Means is provided at the closed ends of the terminals for effecting a mechanical connection therebetween. Radial ports are formed in the terminals adjacent their abutting ends. Sleeve valves sliding on the outside of the tubular chambers provide means for closing the ports when it is desired to disconnect the coupling. One of these valves has an annular recess therein for connecting the ports in the terminals when the latter are rigidly secured together mechanically. The invention also contemplates means for preventing mechanical disconnection of the terminals while the path of the fluid therethrough is maintained open.

For a complete understanding of the invention, reference is made to the accompanying drawings illustrating the present preferred embodiment of the invention, together with certain modifications thereof.

In the drawings—

Figure 1 is a longitudinal sectional view of the coupling with the parts in position for establishing communication between the associated conduits, the parts being shown in elevation, Figure 2 is a view similar to Figure 1 except that it shows the parts in the broken position, in which the coupling members are separated and communication therebetween prevented, Figure 3 is a sectional view along the line III—III of Figure 1, Figure 4 is a partial end view of the coupling terminals shown at the right in Figure 2, Figure 5 is an end view of the coupling terminal shown at the left in Figure 2, Figure 6 is a view similar to Figure 1 showing a slightly modified form of the invention, Figure 7 is an end view of the right hand coupling member as shown in Figure 6, Figure 8 is a view similar to Figure 1 showing a still further modified form of the invention, and Figure 9 is a sectional view along the line IX—IX of Figure 8.

Referring now in detail to the drawings and particularly to Figures 1 through 5, the invention comprises a pair of tubular chambers or coupling terminals 10 and 11. One end of each terminal is closed by a blank end 12. The other end of both terminals is threaded at 13 for connection with conduit sections 14 which it is desired to place in communication. The blank end of the terminal 10 has a threaded lug 15 projecting therefrom and the cooperating end of the terminal 11 is provided with a threaded recess 16 for receiving the projection 15. The threads on the projection 15 in the recess 16 are not continuous but are mutilated as shown so that a slight angular movement of one terminal with respect to the other is sufficient to secure them tightly together.

Adjacent the blank ends 12 of the terminals 10 and 11 radial ports 17 are formed. The radial ports 17 in the terminal 10 are normally closed by a sleeve 18 slidable on the terminal 10, as shown in Figure 2. Similarly, the ports 17 in the terminal 11 are adapted to be closed by a sleeve 19 slidable thereon. The sleeves 18 and 19 are provided with compressible packing rings 20 and split metallic rings 21 which cooperate with annular grooves 22 in the terminals when the sleeves are in the position shown in Figure 2 and effective to close the ports 17. The sleeve 19 has an internal recess 23, the purpose of which will appear shortly.

Assuming that the parts are in the position illustrated in Figure 2 and it is desired to effect a coupling between the conduits 14, the first step is to make a mechanical connection between the terminals 10 and 11 by means of the threaded projection 15 and the recess 16. When this has been done, the sleeve 19 is pushed along the terminals 10 and 11 until the sleeve 18 reaches the end of the terminal 10. At that time the sleeves will be positioned as shown in Figure 1 and the sleeve 19, by virtue of its internal recess 23, will serve to connect the ports 17 in the terminals. When the coupling has been made, the split rings 21 in the sleeve 19 cooperate with the annular grooves near the ends of the terminals 10 and 11 to prevent accidental shifting of the sleeve thereon. A compressible ring 24 serves as a resilient spacer between terminals.

It will be apparent from the foregoing description that the construction of the coupling is simple and can be effected with a minimum of expense. At the same time, the conduit functions very efficiently and provides a tight coupling for fluid lines under considerable pressure. In addition, the coupling can be made or broken very quickly with a minimum of effort and without special tools.

Figures 6 and 7 illustrate a slightly modified form of the invention which is similar to that already described in most respects. The distinguishing features of this form of the invention as shown in Figures 6 and 7 are that handles 25 are formed integral with the terminals 10 and 11 to facilitate manipulation of the latter when making the mechanical connection therebetween.

Another distinguishing feature of the modified form of the invention consists in the provision of a spring-pressed detent 26 in the projection 15 on the terminal 10, which detent is adapted to cooperate with recesses 27 formed in the bottom of the recess 16 in the terminal 11. The function of the detent 26 is to resist accidental mechanical disengagement of the coupling terminals while they are still in communication through the recess 23 in the sleeve 19 without preventing disengagement of the terminals when the sleeve valve have been shifted to close the ports 17.

Another means for accomplishing this result, which is more positive in effect, is illustrated in Figures 8 and 9. The construction here shown is similar in all respects to that of Figures 6 and 7 with the following exceptions. The terminal 10 is provided with projections 28 adjacent the handle which are adapted to enter correspondingly shaped recesses 29 in the end of the sleeve 18. The sleeve 18 is thereby keyed to the terminal 10. The sleeve 19 is provided with spring-pressed detents 30 and 31 which are pivotally mounted adjacent the ends of the sleeve. The detent 30 is adapted to enter aligned recesses 31' and 32 in the ends of the sleeves 18 and 19 to key them together. The detent 31 is adapted to enter a recess 33 in the terminal 11 to lock the latter to the sleeve 19. All the parts of the coupling are thus secured rigidly together and accidental disengagement is prevented.

When it is desired to break the coupling shown in Figures 8 and 9, the detents 30 and 31 are depressed and thereby removed from their recesses so that sleeves 18 and 19 may be shifted to the break position in which they close the ports 17. The terminals may then be unscrewed and separated.

Although I have illustrated and described but one preferred embodiment of the invention and two slight modifications thereof, it will be apparent that the invention may be embodied in forms other than those shown. For that reason I do not intend to be limited to the specific embodiments disclosed herein and any changes in the construction disclosed may be made without sacrificing the advantages or departing from the spirit of the invention as set forth in the appended claims.

I claim:

1. In a coupling, the combination with a pair of connectible conduit terminals having closed ends and radial ports, of sleeve valves on said terminals for said ports, said valves being adapted to overlie said ports and one of said valves having means for connecting said ports.

2. A coupling for fluid lines comprising a pair of members with blank ends having connecting means, radial ports in the members and independent sleeve valves on said members for closing said ports, one valve having means for placing the ports in communication.

3. A coupling comprising a pair of members having blank ends, means for mechanically connecting said ends, radial ports in said members and a sleeve valve for the ports of each member, one of said valves having an annular recess for connecting said ports.

4. A coupling comprising a pair of members with mechanically connectible blank ends, and radial ports, independent sleeve valves for closing the ports, one valve having means for connecting the ports, and means for resisting disconnection of said ends.

5. A coupling for fluid lines comprising two tubular members each closed at one end, integral means for connecting said members with their closed ends abutting, radial holes in said members adjacent their closed ends, sleeves surrounding said members and independently slidable thereon for closing said holes, one of said sleeves having an annular recess adapted to provide communication between said holes.

6. A coupling for fluid lines comprising two tubular chambers with closed ends adapted to be connected end to end, radial holes in said chambers and independent sleeves slidable thereon for closing said holes, one of said sleeves having an annular recess adapted to establish communication between said holes.

7. A coupling for conduits comprising a pair of blank ends attached to conduit sections, means for connecting said ends, radial ports adjacent said ends and sleeve valves for closing the ports, one valve having means for placing the ports in communication.

ROBERT V. PROCTOR.